United States Patent

[11] 3,593,104

[72] Inventors William W. Fisher
Woodstock;
John W. Pike, Endwell, both of, N.Y.
[21] Appl. No. 836,758
[22] Filed June 26, 1969
[45] Patented July 13, 1971
[73] Assignee Rotron Incorporated
Woodstock, N.Y.

[54] FREQUENCY CONVERTER PROVIDING
EMPLOYABLE OUTPUT FREQUENCIES
11 Claims, 19 Drawing Figs.
[52] U.S. Cl. .................................................... 321/4,
321/60, 321/69 R
[51] Int. Cl. .................................................... H02m 5/40
[50] Field of Search .................................... 321/4, 5,
18, 27, 60, 69

[56] References Cited
UNITED STATES PATENTS
| | | | |
|---|---|---|---|
| 3,089,992 | 5/1963 | Seney............................ | 321/4 X |
| 3,246,231 | 4/1966 | Clarke.......................... | 321/69 |
| 3,320,514 | 5/1967 | Lawrence...................... | 321/18 X |
| 3,320,515 | 5/1967 | Amato et al. .................. | 321/18 X |
| 3,391,327 | 7/1968 | Pelly............................. | 321/27 |
| 3,407,348 | 10/1968 | Lawrence et al. ............. | 321/27 |
| 3,416,065 | 12/1968 | Redfern........................ | 321/61 |
| 3,422,338 | 1/1969 | Philipps........................ | 321/5 |
| 3,430,123 | 2/1969 | Corry et al.................... | 321/4 X |
| 3,431,483 | 3/1969 | Lafuze.......................... | 321/69 X |

Primary Examiner— William M. Shoop, Jr.
Attorney— Brumbaugh, Graves, Donohue & Raymond ABSTRACT: A frequency converter for providing output frequencies to a load within a range of frequencies employable by the load includes a double bridge switching circuit having two controlled rectifier bridges connected across an input of a frequency ranging from within to greatly exceeding the range of output frequencies desired. A steering circuit alternately triggers the two bridges into conduction for alternate periods of rectification of opposite polarities when the input frequency exceeds the range of desired output frequencies to provide polarity reversal within the desired frequency range. For input frequencies employable by the load, the two bridges are alternately triggered with each reversal of input polarity thereby applying the input, substantially unaltered, to the load. Timing of the alternate triggering of the two bridges is provided by an astable multivibrator having a natural frequency lower than any frequency within the desired range of output frequencies and a pulse generator supplies output pulses in synchronization with the crossover points of the input to override the natural frequency of the multivibrator. Pulses produced by the pulse generator additionally are employed to inhibit triggering of the controlled rectifier bridges during input crossover to allow extinguishing of the component controlled rectifiers and these pulses are derived from a rectified unsmoothed DC signal of a low level DC power supply which provides DC bias potential for the multivibrator, pulse generator and steering circuit.

INVENTORS.
WILLIAM W. FISHER &
BY JOHN W. PIKE their ATTORNEYS

MAINS SUPPLY VOLTAGE

RECTIFIED LINE VOLTAGE

CLOCK MULTIVIBRATOR VOLTAGE

SYNCHRONIZING VOLTAGE

LOAD VOLTAGE

LOAD CURRENT

INVENTORS.
WILLIAM W. FISHER &
BY JOHN W. PIKE

Brumbaugh, Graves, Donohue & Raymond their ATTORNEYS

MAINS SUPPLY VOLTAGE

RECTIFIED LINE VOLTAGE

CLOCK MULTIVIBRATOR VOLTAGE

SYNCHRONIZING VOLTAGE

LOAD VOLTAGE

LOAD CURRENT

INVENTORS.
WILLIAM W. FISHER &
JOHN W. PIKE
BY
Brumbaugh, Graves, Donohue & Raymond
their ATTORNEYS

ID
3,593,104

FREQUENCY CONVERTER PROVIDING EMPLOYABLE OUTPUT FREQUENCIES

This invention relates generally to frequency converters and more specifically to frequency converters for providing output frequencies in a range of frequencies employable by a particular load when energized by an input signal whose frequency may be any of a number of frequencies within and exceeding the range of frequencies employable by the load.

BACKGROUND OF THE INVENTION

The use of electrically operated equipment designed for employment with a power source having a particular predetermined frequency is often precluded by the unavailability of a source of suitable frequency. For example, an AC motor designed and rated to operate when energized from a commonly available 60 c.p.s. source often is employable within a frequency range spanning the rated 60 c.p.s. frequency but exhibits markedly poor performance in frequency ranges lying just outside the relatively narrow employable frequency range and is totally unsuitable for employment with frequencies greatly exceeding the rated 60 c.p.s. frequency. Thus, an AC motor which is otherwise perfectly suitable for employment in a particular application may be rendered unsuitable, for example, in cooperation with shipboard navigational equipment commonly employing a 400 c.p.s. power source.

Alternatively, in applications where relatively wide variation in frequency from a power source is to be expected, electrically operated equipment designed or rated for operation at a particular frequency may be rendered unemployable by the unavailability of a power source having an output frequency within the relatively narrow employable range of the equipment which is sought to be employed.

In situations where the available source frequency lies outside the range of employable frequencies of the equipment to be used and in situations where wide variations in the source frequency are to be expected, frequency conversion has been attempted to provide a frequency closely approximating the rated frequency of the equipment or load to be employed. Typically, such frequency conversion has been provided by a two-step conversion from AC DC and again to AC at the desired frequency. Such two-step conversion, however, generally requires full rectification of the available AC source voltage or main supply to provide a DC voltage of suitable potential and subsequent "chopping" or inverting of the produced DC voltage to provide the alternating source or mains supply of voltage of the desired frequency. Production of the desired frequency by this method, then, requires a relatively large number of components for the production of both the DC voltage and the subsequent production of the output of desired frequency and, additionally, "chopping" or inverting of the produced DC voltage is often effected by controlled rectifier inverters employing relatively bulky and expensive commutation provisions for extinguishing conducting controlled rectifiers repeatedly to produce the desired reversal of polarity at the frequency sought.

Additionally, frequency conversion of the type discussed hereinabove has been effected by the production of the desired frequency from a generator or alternator, driven in turn from a motor connected across the available AC supply. Such systems, however, require the provision of relatively expensive and bulky motors and generators and are generally unsuitable for employment wherein only a single device or small number of devices require the frequency which is to be produced. Additionally, where the available AC source is of indeterminate frequency, varying within a range of frequencies, this available range of frequencies may lie outside the employable frequency range of the AC motor which is employed to drive a generator or alternator and hence employment of such a system often will be precluded.

While systems have been suggested wherein the precise output frequency may be derived from a power source of unemployable frequency, such systems have generally been concerned with the precise determination of the output frequency through the provision of relatively sophisticated or complex frequency control provisions providing output frequencies of substantially the exact frequency desired. The precise control of the output frequency, then, requires relatively expensive and complex systems employing, for example, high-accuracy oscillators or pulse generators of relatively high frequency which provide a standard for maintaining the accuracy of the finally produced employable frequency.

SUMMARY OF THE INVENTION

In accordance with this invention, there is provided a frequency converter for providing an employable output frequency which may vary within a range of frequencies employable by the particular load device, allowing employment of the load device with power sources whose frequency may lie within or outside the range of employable frequencies or may vary over a relatively wide range of frequencies such as would normally render the particular load device unsuitable for employment with the source.

In the system according to the invention, the components employed in providing the desired output frequencies are of a relatively light weight, inexpensive and compact nature, allowing their employment with a single load device which is otherwise suitable for a particular use. Accordingly, the frequency converter according to the invention may be supplied with the electrically operated device without undue regard to the frequency of the primary source or mains supply which is available. Essentially, the power supplied to the load or load device is the power provided by the primary source or mains supply, alternately rectified at a frequency within a range of employable frequencies when the available primary source frequency lies outside such range of frequencies.

The output voltage of the primary source or mains supply is rectified alternately to provide an alternate output polarity at a frequency within the aforementioned employable range of frequencies as determined by the frequency of the mains supply. Thus, the frequency of the mains supply is, itself, employed to determine the rate at which rectification is alternated and an independent precise frequency generator or oscillator is not required nor is the production of a high level DC voltage employed such as requires the employment of a relatively bulky and expensive independent rectification arrangement employed in addition to the frequency determinative portions of the frequency converter.

In view of the foregoing, then, it is a primary object of this invention to provide a novel and improved frequency converter requiring little space, being of light weight and of a relatively inexpensive nature.

Another object of this invention is to provide a frequency converter employable with a primary source of power whose frequency may be any of a number of frequencies within a wide range or may vary over a relatively wide range of frequencies, to produce output frequencies within a predetermined employable range of frequencies.

A further object of this invention is to provide a frequency converter in accordance with the immediately foregoing object wherein the frequency of the primary source may be within or well outside of the range of employable frequencies desired.

Yet another object of this invention is to provide a frequency converter for the production of output frequencies within a predetermined employable range of frequencies by the alternate rectification of the voltage from a primary AC source, the timing of alternate rectification being dependent upon the frequency of the primary source.

Still another object of this invention is to provide a frequency converter for the production of output voltages alternating in polarity, such alternation being controlled by a timing circuit having a natural, unsynchronized frequency lying outside the range of desired employable final output frequencies.

Additionally, it is an object of this invention to provide a frequency converter wherein a predetermined employable range of output frequencies is provided as determined by a timing circuit having a natural, unsynchronized frequency outside the desired range of frequencies and wherein the natural unsynchronized frequency of the timing circuit is overridden by by the application thereto of pulses derived from a primary source of AC voltage.

With the foregoing, and other objects in view that will hereinafter appear, the nature of the invention will be more clearly understood by reference to the following detailed description and the several views illustrated in the accompanying drawings, setting forth a preferred embodiment of the invention.

IN THE DRAWINGS

FIG. 1 is a diagrammatic illustration of a frequency converter according to this invention showing, in block diagram form, the component circuits combining to provide an output frequency within a predetermined range of employable frequencies.

FIG. 2 is a schematic illustration of a double bridge switching circuit employable in the arrangement according to FIG. 1 and shows a pair of alternately actuable controlled rectifier bridges connected across a pair of mains supply conductors.

DESCRIPTION OF PREFERRED EMBODIMENT

Figure 3:
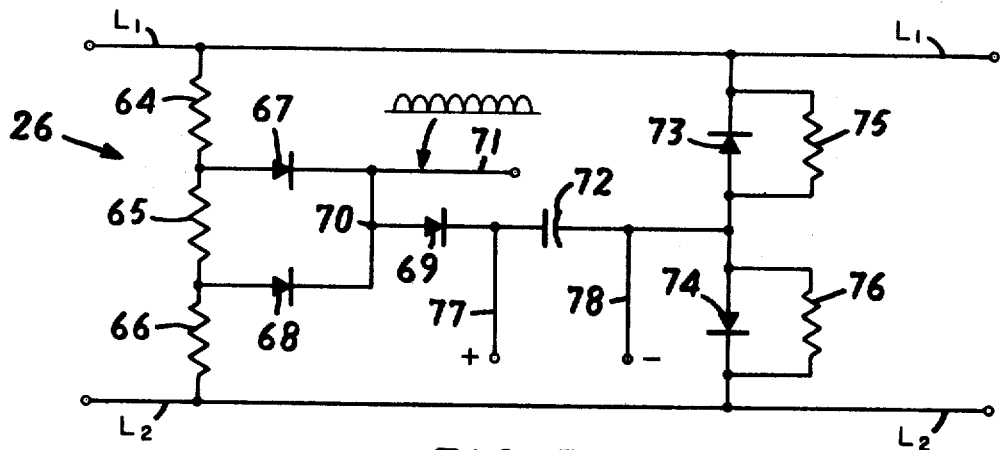
FIG. 3 is a schematic illustration of a low level DC power supply employable, in the arrangement according to FIG. 1, to provide a rectified smoothed DC bias voltage.

Referring now to drawings in detail, there is generally illustrated in FIG. 1 a novel frequency converter 10 connected across a primary source or mains supply 11 which applies an alternating voltage to a pair of mains conductors L1 and L2. The frequency of the primary source 11 may be any of a number of frequencies within a wide range of frequencies or may vary over a substantially wide range of frequencies. The output from the frequency converter 10 is applied to a load 12 which may be any of a number of electrically operated devices operated when supplied from an AC power source having a frequency within a relatively limited range of frequencies. For example, the load 12 may be a device or number of devices rated at a particular input frequency but satisfactorily operable within a range of frequencies approaching the rated input frequency. A more specific example of such device would be any of a number of commercially available AC motors, having a rated frequency of 60 c.p.s. Most such motors, it should be noted, provide close to design performance at frequencies of, say, 50 to 70 c.p.s. but begin to provide inadequate performance when supplied with input power at frequencies outside this range.

The output taken from the converter 10 and supplied to the load 12 is provided by a double bridge switching circuit 13 connected across the mains supply lines L1 and L2. The double bridge switching circuit 13 provides a rectified output, alternating in polarity at a frequency within the range of frequencies employable by the load 12. Alternation of the polarity of rectified output from the double bridge switching circuit 13 is controlled by a trigger steering circuit 14 having first and second outputs 15 and 16 which are alternately employed to control the double bridge switching circuit, giving alternate periods of rectification of the input applied to the conductors L1 and L2 by the primary source 11.

The duration of each alternate period of rectification is controlled by a timing circuit or clock multivibrator circuit 17 having two outputs 18 and 19 connected with the trigger steering circuit 14 to control the time duration of trigger signals appearing at each of the outputs 15 and 16 of the trigger steering circuit 14.

The timing circuit or clock multivibrator circuit 17 has a natural, unsynchronized output frequency lower than any of the frequencies in the range of frequencies employable by the load 12. However, a synchronizing and trigger inhibiting pulse generator 21 applies output voltage pulses to the clock circuit 17 via a pair of outputs 22 and 23 to override the natural frequency of the clock circuit 17, causing the output from the clock circuit 17 to occur within the range of employable frequencies. Additionally, the synchronizing and trigger inhibiting pulse generator 21 includes two further outputs 24 and 25 connected with the trigger steering circuit 14 to inhibit triggering of the double bridge switching circuit 13 in a manner which will be described more fully hereinafter.

A low level DC power supple 26 is connected across the mains conductors L1 and L2 to provide rectified and smoothed low level DC voltage across a pair of outputs 27 and 28. The low level DC voltage produced by the supply 26 is employed by the trigger steering circuit 14, a clock circuit 17 and pulse generator 21 for biasing of the semiconductor components included therein. Additionally, however, the low level DC power supply 26 provides a rectified but unsmoothed output voltage at an output 30. The voltage appearing at the output 30 from the supply 26, then, is a plurality of relatively low level rectified DC pulses concurrent with alternate half-cycles of input voltage from the primary source 11. The pulse generator 21 employs the rectified and unsmoothed voltage from the supply 26 to produce the output pulses therefrom in synchronization with the crossover points of the voltage waveform of the primary supply 11.

The double bridge switching circuit 13 which is connected across the mains conductors L1 and L2 and which provides the output to the load 12 is best illustrated in FIG. 2 wherein it will be seen that a plurality of selectively actuable unidirectional switching means are provided by a number of silicon or semiconductor controlled rectifiers 31 through 38, commonly referred to as SCR's. Each of the semiconductor controlled rectifiers 31 through 38 includes an anode 40, a cathode 41, and a gate or control electrode 42.

Conduction of current through the controlled rectifiers 31 through 38 is in the direction from the anodes 40 to the cathodes 41 when the anodes 40 are biased positively with respect to the cathodes 41 and appropriate biasing is applied to the trigger electrodes 42 as by the application of a trigger pulse thereto. The controlled rectifiers 31 through 38 are effective to block current conduction in a reverse direction and the eight controlled rectifiers 31 through 38 of FIG. 2 provide two rectifying means suitable for rectification of the voltage applied thereto by the mains conductors L1 and L2 to provide alternate periods of rectified output voltage across the load 12, reversing in polarity with the employment of alternate ones of the two rectifying means.

The controlled rectifiers 31 through 34 provide the first rectifying means or rectifier bridge, being effective to provide voltage of only a single polarity across the load 12 and the controlled rectifiers 35 through 38 combine to provide the second rectifying means, effective to supply a rectified voltage across the load 12, opposite in polarity to the voltage provided by the first rectifying means including the controlled rectifiers 31 through 34.

The first rectifier bridge or rectifying means, including the controlled rectifiers 31 through 34, is actuated by the application of a trigger pulse or triggering signal to the control electrodes 42 of the controlled rectifiers 31 and 33 via a secondary winding 43 of a signal transformer T1 having a primary driven by the trigger steering circuit 14 shown in FIG. 1. Similarly, positive triggering signals are applied to the control electrodes 42 of the controlled rectifiers 32 and 34 via a conductor 44 connected with the trigger steering circuit 14 and these pulses are applied to the control electrode 42 of the controlled rectifier 32 through a current limiting resistor 45 and a diode 46 while pulses applied to the electrode 42 of the controlled rectifier 34 are fed thereto via a current limiting resistor 47 and a diode 48.

A further pair of resistors 50 and 51 connected, respectively, between the mains conductors and the control electrodes of the controlled rectifiers 34 and 32 provide, in combination with the current limiting resistors 45 and 47, a suitable low impedance output for the steering circuit which will hereinafter be described in detail. The diodes 46 and 48 provide circuit isolation, preventing the triggering of the controlled rectifiers 32 and 34 into conduction by the voltages appearing across the mains conductors L1 and L2. For example, should the conductor L2 be positive with respect to the conductor L1, the controlled rectifier 34 would normally be biased into conduction, absent the provision of the blocking diode 46, preventing passage of current through the resistors 45, 47, 50 and 51, connected across the conductors L1 and L2. As will be apparent to those skilled in the art, the controlled rectifiers 32 and 34 may be triggered into conduction by the provision of a further secondary winding of a signal transformer, driven by the steering circuit 14 in a fashion similar to the employment of the secondary winding 43 connected with the control electrodes of the controlled rectifiers 31 and 33.

Upon simultaneous application of triggering pulses or triggering levels to the control electrodes 42 of the controlled rectifiers 31 through 34, full-wave rectification will occur, current being provided through the load 12 in the direction of the arrow 52 shown in FIG. 2. During a half-cycle of input voltage wherein the mains conductor L1 is positive with respect to the mains conductor L2, conduction will be from the conductor L1 through the controlled rectifier 31, the load 12, and the controlled rectifier 32. The controlled rectifiers 33 and 34 will be reversely biased and in a nonconducting state. During a half-cycle of input voltage wherein the conductor L2 is positive relative to the conductor L1, conduction through the load in the direction of the arrow 52 will be effected through the controlled rectifiers 33 and 34 while the controlled rectifiers 31 and 32 will remain in a reversely biased condition.

For reversal of the polarity of the voltage applied to the load 12 and reversal of the direction of current therethrough in the direction of the arrow 53 shown in FIG. 2, positive trigger pulses or triggering signals are applied to the control electrodes 42 of the controlled rectifiers 35 and 37 by a secondary winding 54 of the transformer T1 and triggering of the controlled rectifiers 36 and 38 is effective via a conductor 55, again driven from the steering circuit 14 shown in FIG. 1. Here again, a series of resistors 56 through 59 and a pair of diodes 61 and 62 are connected across the mains conductors L1 and L2 and function in substantially the fashion discussed hereinabove with respect to the corresponding resistors and diodes associated with the controlled rectifiers 32 and 34. It will be seen that the simultaneous triggering of the controlled rectifiers 35 through 38 effects full-wave rectification and the conduction of current through the load in the direction of the arrow 53 in substantially the same manner as discussed hereinabove with respect to the operation of the controlled rectifiers 31 through 34.

Figure 8A:
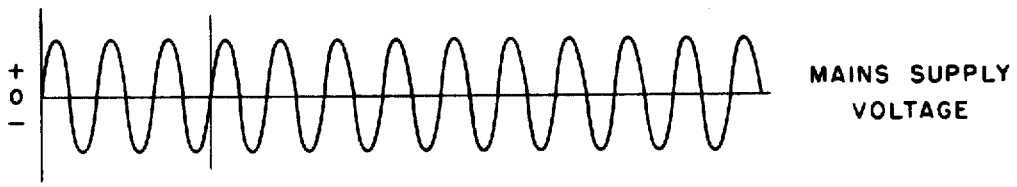
FIG. 8 is a series of diagrams, similar to those of FIG. 7, and illustrates voltage and current characteristics at selected points when the frequency converter is driven from a mains supply of relatively high frequency.
Figure 8B:
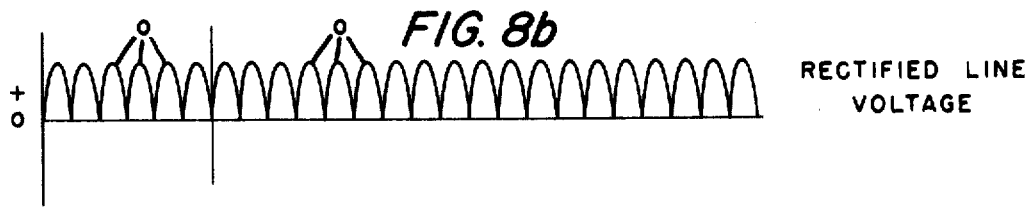
Figure 8C:
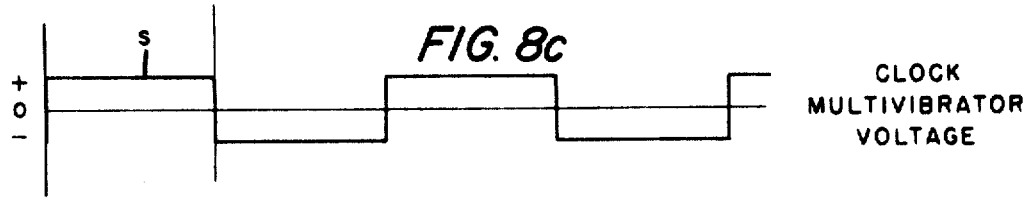
Figure 8D:
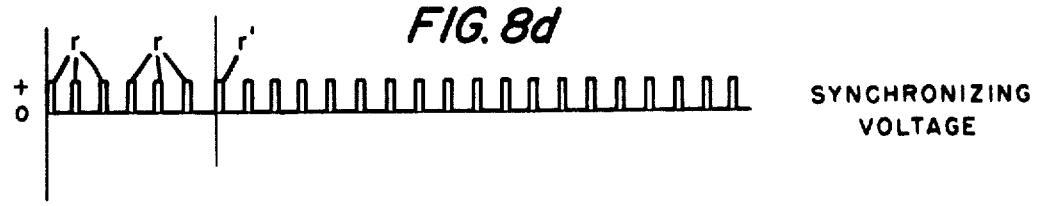
Figure 8E:
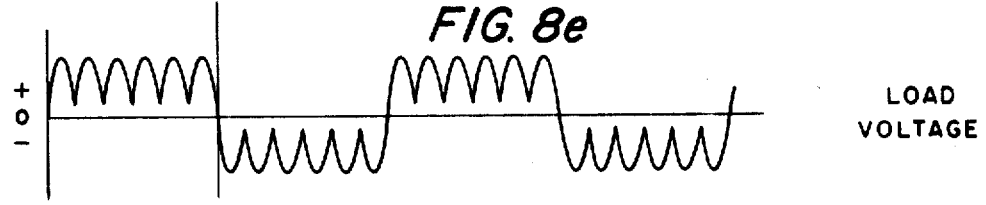

With repetitive alternate actuation of the two rectifying means or rectifier bridges connected across the conductors L1 and L2, the voltage applied to the load 12 will be substantially as diagrammatically characterized in FIG. 8(e) for input frequencies greater than the frequencies within the predetermined range of frequencies employable by the load. Connection of a capacitor 63 across the load as shown in broken lines in FIG. 2 may be employed to prevent the voltage at the load going to zero during full-wave rectification of either polarity and to increase the average voltage seen by the load 12.

The steering circuit 14, the clock circuit 17, and the pulse generator 21 all include semiconductor devices or transistors, requiring a low level DC voltage for the biasing thereof. The low level DC power supply 26 which is connected with each of the circuits 14, 17 and 21 is best illustrated in FIG. 3 and includes three resistors 64, 65 and 66 connected in series across the conductors L1 and L2 to provide a voltage divider determinative of the output DC voltage of the supply 26. A pair of diodes 67 and 68 are connected to opposite sides of the resistor 65 and are further connected through a diode 69 and a capacitor 72 with a pair of diodes 73 and 74 which are connected across the mains conductors L1 and L2.

It will be seen that the diodes 67, 69 and 74 provide a current path through the capacitor 72 for half-cycles of input voltage during which the conductor L1 is positive with respect to the conductor L2. Alternately, it will be seen that the diodes 68, 69 and 73 provide a path of current flow through the capacitor 72 in the same direction during the remaining half-cycles of applied input voltage. Accordingly, the voltage appearing across the capacitor 72 is a full-wave rectification of the mains supply voltage of an amplitude determined by the resistive value of the resistors 64, 65 and 66, the capacitor 72 providing a smoothing or averaging of the voltage produced thereacross to eliminate the repetitive variations in amplitude ordinarily occurring upon rectification of an AC input. A pair of conductors 77 and 78 are connected to opposite sides of the capacitor 72 to supply the rectified, smoothed low level DC voltage for biasing purposes to the steering circuit 14, clock circuit 17, and pulse generator 21.

A further conductor 71 is connected with a junction point 70 of the two diodes 67 and 68 for supplying a rectified but unsmoothed DC output voltage for employment by the synchronizing and trigger inhibiting pulse generator 21 shown in FIG. 1. The diode 69, connecting the junction 70 with one side of the capacitor 72, prevents application of the smoothing action of the capacitor 72 to the rectified output appearing at the junction 70. The rectified, unsmoothed DC voltage appearing at the junction 70 and the conductor 71 is represented in FIGS. 7 (b) and 8(b) for mains supply voltages of relatively low and relatively high frequencies, respectively.

A pair of resistors 75 and 76, connected across the diodes 73 and 74, respectively, provides return paths for trigger pulses applied to the controlled rectifiers 32, 34, 36 and 38 in the double bridge switching circuit 13 shown in FIG. 2 as will become more apparent from the discussion of the overall operation of the frequency converter 10, appearing hereinafter. The resistors 75 and 76 may be omitted when the controlled rectifiers 32, 34, 36 and 38 are triggered into conduction from the secondary of a signal transformer in a manner similar to the application of trigger pulses to the control electrodes 42 of the controlled rectifiers 31, 33, 35 and 37 by the secondaries 43 and 54 of the transformer T1.

Figure 4:
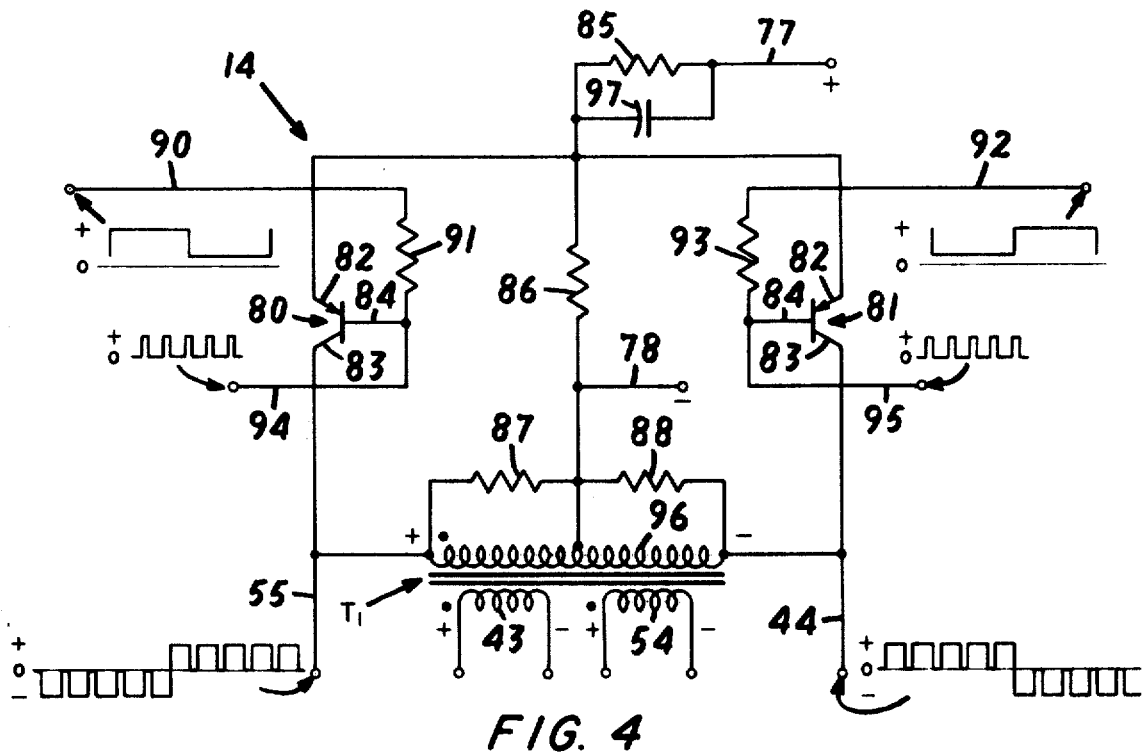
FIG. 4 is a schematic illustration of a steering circuit for controlling the triggering of controlled rectifiers included in the double bridge switching circuit illustrated in FIG. 2.

The trigger steering circuit 14, best illustrated in FIG. 4, includes a pair of transistors 80 and 81, each including an emitter electrode 82, a collector electrode 83, and a base electrode 84. Biasing of the emitter-collector circuits of the transistors 80 and 81 is provided by a series of resistors 85, 86, 87 and 88. The resistor 85 is connected with the conductor 77 constituting the positive output of the low level DC supply 26 and the emitters 82 of the transistors 80 and 81 are connected with the remaining side of the resistor 85. The collectors 83 of the transistors 80 and 81 are connected with the negative conductor 78 from the low level DC supply via the two resistors 87 and 88, and the resistor 86 connected between the emitters of the transistors 80 and 81 and the negative DC supply conductor 78 establishes the voltage across the emitter-collector circuits of the two transistors.

The transistors 80 and 81 are biased into conduction by the application, to the bases 84 thereof, of a DC level lower than the positive voltage applied to the emitters 82. A conductor 90 and a current limiting resistor 91 is connected with the base 84 of the transistor 80 for this purpose and, similarly, a conductor 92 and a current limiting resistor 93 is connected with the base 84 of the transistor 81 for determining the periods of conduction thereof. Further conductors 94 and 95 are connected with the bases of the transistors 80 and 81, respectively, for the application thereto of inhibiting pulses as will be discussed more fully hereinafter.

A primary winding 96 of the signal transformer T1 is connected between the collectors of the transistors 80 and 81 and conduction of the transistor 80 effects current flow through the primary winding 96 to the negative DC supply conductor 78. A triggering signal or trigger pulse is produced and fed to the double bridge switching circuit 13 via the conductor 55 and further signals or pulses are produced across the secondary windings 43 and 54, the polarity of the signal produced across the secondary 54 being effective to trigger into conduction the controlled rectifiers having their gates or control electrodes connected therewith as will appear more fully hereinafter. Similarly, upon the application of an appropriate signal to the base 84 of the transistor 81, via the conductor 92 and resistor 93, a triggering signal or pulse is produced at the conductor 44 and signals of reversed polarity appear across the secondary windings 43 and 54, the secondary winding 43 being properly wound and connected with respect to the primary winding 96 and control electrodes of the controlled rectifiers connected therewith to apply a suitable triggering signal to those control electrodes. A capacitor 97 connected across the resistor 85 blocks possible spurious signals present on the DC supply conductor 77 from reaching the control electrodes of the controlled rectifiers 38 via the output conductors 44 and 55 and the secondary windings 43 and 54 of the trigger steering circuit 14.

Figure 5:
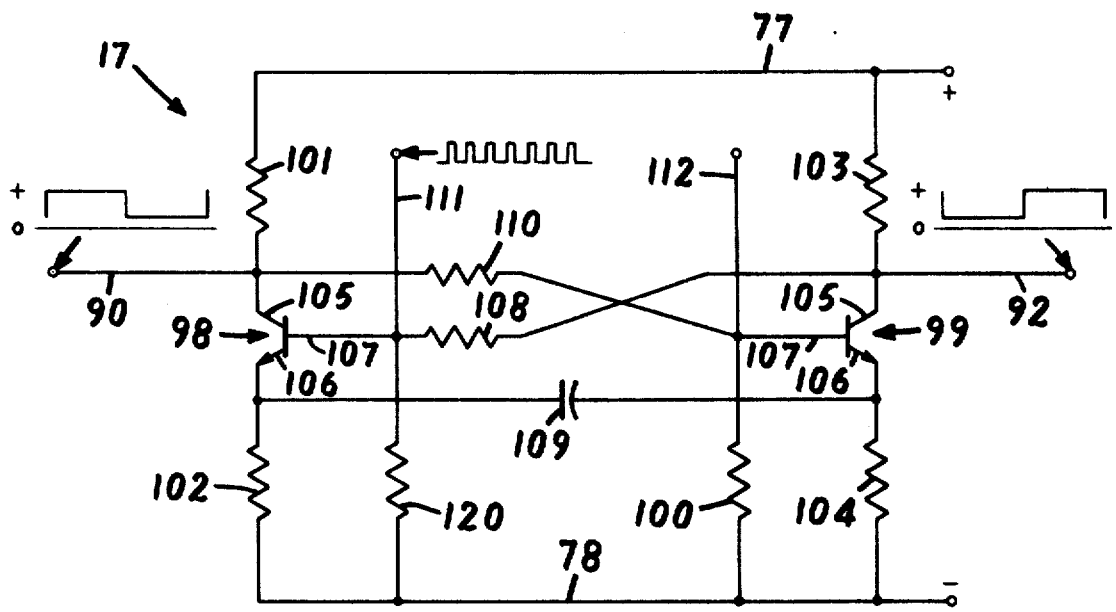
FIG. 5 is a schematic illustration of a timing or clock circuit and shows an astable multivibrator having alternate output conditions for controlling trigger outputs from the steering circuit illustrated in FIG. 4.

The clock multivibrator circuit 17 which is best illustrated in FIG. 5 controls the alternate periods of conduction of the steering circuit transistors 80 and 81. The clock multivibrator circuit 17 is constituted by an astable multivibrator connected, via the conductors 90 and 92 with the bases 84 of the steering circuit transistors 80 and 81 and the multivibrator 17 provides two output conditions, alternately occurring at each of the conductors 90 and 92.

A pair of transistors 98 and 99 are connected in parallel across the DC voltage supply conductors 77 and 78, in series with appropriately selected resistors 101 through 104. Each of the transistors 98 and 99 includes a collector electrode 105, an emitter electrode 106, and a base electrode 107, and the base electrode 107 of the transistor 98 is connected via a resistor 108 to the junction of the collector 105 of the transistor 99 and the resistor 103. A capacitor 109 connected between the emitters 106 of the transistors 98 and (99 determines, in combination with the resistors 102 and 104, the natural unsynchronized frequency of recurrence of the output conditions at the conductors 90 and 92.

With the transistor 98 conducting, a current flow will be established through the resistor 101, the collector-emitter circuit of the transistor 98, and the resistor 102. At this time, the transistor 99 will be in an initial nonconducting condition. The base 107 of the transistor 99 is connected, via a resistor 110 with the junction of the collector 105 of the transistor 98 and the resistance 101. The voltage established across a resistance 100 and applied to the base 107 of the transistor 99 will be less positive than the voltage appearing at the collector 105 of that transistor and the DC voltage at the emitter 106 of the transistor 99 will gradually approach the negative DC voltage appearing upon the DC supply conductor 78, the time rate of change of voltage at the emitter 106 of the transistor 99 being dependent upon the value of capacitance of the capacitor 109.

As the voltage at the emitter of the transistor 99 approaches the negative voltage appearing upon the conductor 78, the transistor 99 begins to conduct, being now fully forwardly biased, and the voltage appearing at the collector 105 of the now-conducting transistor 99 decreases sharply, reducing the voltage appearing across a resistor 120 and applied to the base 107 of the transistor 98, halting conduction of the transistor 98 and, again, the voltage at the emitter 106 of the transistor 98 gradually approaches the negative voltage upon the DC supply conductor 78 for subsequent conduction of the transistor 98 and halting of conduction of the transistor 99. Absent alteration of the frequency of the multivibrator, alternate periods of conduction of the transistors 98 and 99 at the natural, unsynchronized frequency of the multivibrator 17 would ordinarily ensue, causing the production of alternate voltage waveforms of substantially square wave configuration on the conductors 90 and 92 connected with the collectors of the transistors 98 and 99, respectively.

When the transistor 98 is conducting, the voltage appearing upon the conductor 90 will be at its least positive value and the transistor 99 will be in a nonconducting condition, the voltage appearing upon the conductor 92 being at its maximum positive value at this time. Accordingly, during this period, the base 84 of the steering transistor 80 shown in FIG. 4 will be less positive with respect to the emitter 82 thereof (or negative with respect to that emitter), causing conduction of the steering transistor 80 and the production of corresponding triggering signals or trigger pulses by the trigger steering circuit 14 of the FIG. 4. Conversely, of course, during periods of conduction of the transistor 99 of the clock multivibrator circuit 17 of FIG. 5, the steering transistor 81 is biased into conduction, producing corresponding triggering signals or trigger pulses by the trigger steering circuit 14 of FIG. 4.

Returning to FIG. 5, a further pair of conductors 111 and 112 are shown connected with the bases 107 of the transistors 98 and 99, respectively, these conductors being supplied with repetitively occurring voltage pulses from the pulse generator 21 shown in FIG. 1.

It will be seen that as the emitter 106 of either of the multivibrator transistors 98 and 99 approaches a negative voltage value sufficient to provide conduction of the associated transistor, the application of a positive voltage pulse, via either of the conductors 111 and 112, is sufficient to cause the base 107 of the nonconducting transistor to become sufficiently positive with respect to the emitter 106 thereof to provide premature conduction of the nonconducting transistor, effecting halting of conduction of the remaining transistor. Thus, the application of repetitive positive pulses to the conductors 111 and 112 overrides the natural, unsynchronized frequency of the clock multivibrator circuit 17, reducing the time between conduction of the transistors 98 and 99 and, consequently, reducing the time between the application of corresponding trigger pulses to the controlled rectifiers of the double bridge switching circuit 13 shown in FIG. 2.

Figure 6:
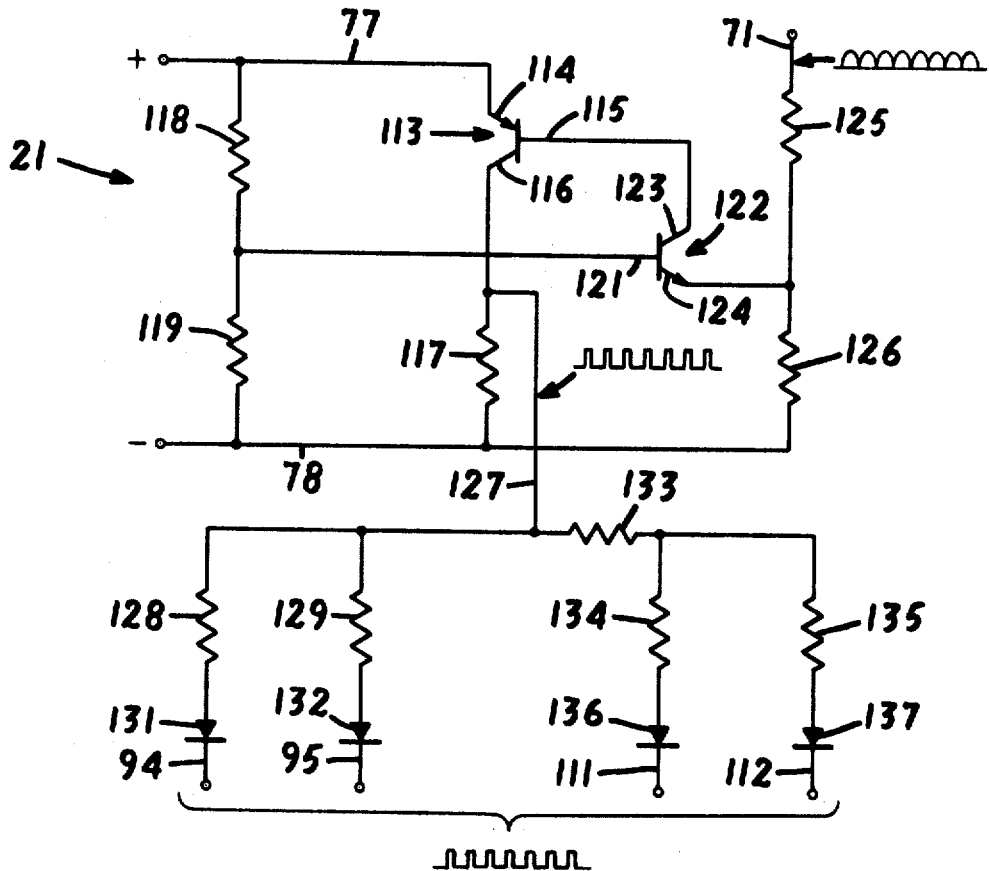
FIG. 6 is a schematic illustration of a synchronizing and trigger inhibiting pulse generator employable in cooperation with the clock circuit of FIG. 5 and the steering circuit of FIG. 4 for overriding the natural, unsynchronized frequency of the astable multivibrator and for precluding triggering of the double bridge switching circuit controlled rectifiers during pulse generation.

The pulses applied to the bases of the steering transistors 80 and 81, shown in FIG. 4, via the conductors 94 and 95 connected therewith and the pulses applied to the conductors 111 and 112 and thereby to the bases 107 of the multivibrator transistors 98 and 99 are produced by the synchronizing and trigger inhibiting pulse generator 21 which is best illustrated in FIG. 6. The pulse generator 21 includes a PNP transistor 113 having an emitter electrode 114, a base electrode 115, and a collector electrode 116, the emitter-collector circuit of the transistor 113 being connected, in series with a resistor 117 across the DC supply conductors 77 and 78 which supply the DC output of the low level DC power supply 26 illustrated in FIG. 3. A pair of resistors 118 and 119 which are connected in series across the DC supply conductors 77 and 78 form a voltage divider providing a bias potential for a base electrode 121 of an NPN transistor 122. A collector electrode 123 of the transistor 122 is connected directly with the base electrode 115 of the PNP transistor 113 and an emitter electrode 124 is connected with the median point of a further voltage divider provided by a further pair of resistors 125 and 126. The resistors 125 and 126 are connected between the negative DC supply conductor 78 and the conductor 71 which applies the rectified but unsmoothed voltage pulses produced by the low level DC power supply 26 of FIG. 3 as discussed hereinabove.

The voltage supplied to the base 121 of the transistor 122 from the median point of the two transistors 118 and 119 is selected to provide forward biasing of the transistor 122 when the voltage supplied to the conductor 71 drops to a predetermined low level intermediate high level points on the series of unidirectional pulses applied thereto. The point at which the transistor 122 is forwardly biased is represented in FIg. 7(b) by the point p, appearing near the minimum voltage points on the rectified, unsmoothed signal from the DC power supply 26.

Forward biasing of the NPN transistor 122 of the pulse generator 21 draws current through the base electrode 115 of the PNP transistor 113 via the collector-emitter circuit of the transistor 122 and the resistor 126 connected with the negative DC power supply conductor 78 and the transistor 113 is biased into conduction, causing current flow through the emitter-collector circuit of the transistor 113 and the resistor 117, also connected with the supply conductor 78. A positive voltage occurs across the resistor 117 by virtue of the current now flowing therethrough and the positive voltage occurring thereacross ceases when the transistor 113 halts conduction through the emitter-collector circuit thereof as the voltage appearing upon the conductor 71 again reaches the predetermined positive value at which forward biasing of the transistor 122 was effected. The point at which the transistors 113 and 122 cease conduction is illustrated in FIG. 7(b) at point q. Thus, a series of positive voltage pulses appear across the resistor 117 of the pulse generator 21, these pulses being concurrent with the crossover points of the voltage waveform appearing across the mains or supply conductors L1 and L2.

The series of positive pulses occurring across the resistor 117 are fed via a conductor 127 to a pair of current limiting resistors 128 and 129 and blocking diodes 131 and 132 to the conductors 94 and 95 connected with the bases 84 of the steering transistors 80 and 81, respectively, of the trigger steering circuit 14 as shown in FIG. 4. Application of the positive steering pulses to the bases 84 is sufficient to inhibit conduction of the transistors 80 and 81 during periods corresponding to the crossover points of the applied mains supply voltage and, accordingly, all triggering signals or trigger pulses applied to the controlled rectifiers 31 through 38 of the double bridge switching circuit shown in FIG. 2 are removed during such crossover points, thus precluding the possibility of triggering directly into a short circuit across the mains supply conductors L1 and L2. That is, if, for example, the controlled rectifier 36, shown in FIG. 2, were to be conducting during the application of a triggering signal or pulse to the control electrode 42 of the controlled rectifier 31, a direct short circuit would be effected across the conductors L1 and L2 via the controlled rectifiers 31 and 36. The mere failure of application of a trigger pulse to the control electrode 42 of the controlled rectifier 36 is not sufficient to halt conduction in the controlled rectifier while a forwardly biased condition exists across the anode-cathode circuit thereof. When, however, the anode-cathode circuit of the controlled rectifier 36 is reversely biased, conduction therethrough will be precluded and at that time triggering signals will be applied simultaneously to the controlled rectifiers 31 through 34 without fear of directly connecting together the mains supply conductors L1 and L2.

Additionally, the positive pulses produced by the pulse generator 21 of FIG. 6 across the resistor 117 thereof are applied, via current limiting resistors 133, 134 and 135 and blocking diodes 136 and 137, to the conductors 111 and 112 which are connected with the bases 107 of the clock multivibrator circuit transistors 98 and 99 shown in FIG. 5. As explained hereinabove, the application of the positive pulses applied to the bases 107 overrides the natural duration of conduction of the two transistors 98 and 99, synchronizing the timing of the astable multivibrator with crossover points of the mains supply voltage appearing across the conductors L1 and L2. The frequency of reversal of the output conditions of the clock multivibrator circuit 17 will, then, be dependent upon the frequency of the applied mains supply voltage but will be limited by the natural frequency of the multivibrator circuit 17 inasmuch as the biasing of the transistors 98 and 99 must approach forward biasing thereof for a particular pulse applied via the conductors 111 and 112 to be effective to alter the output condition of the multivibrator.

OPERATION

Figure 8F:
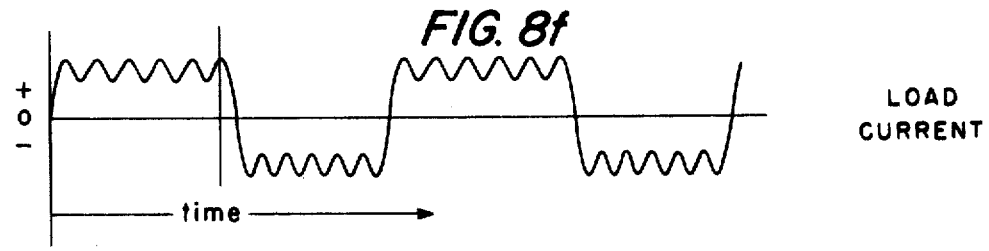
Figure 9:
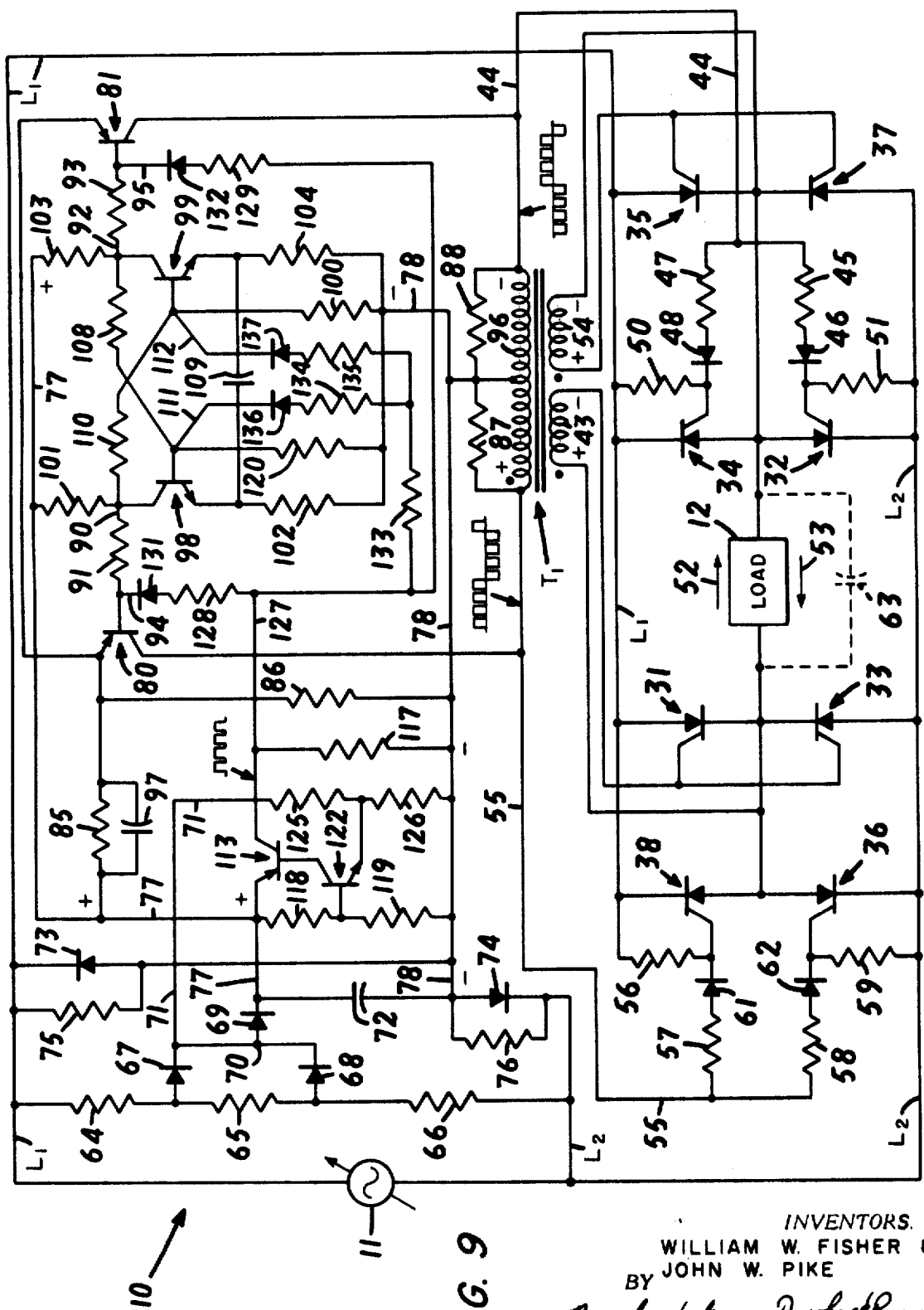
FIG. 9 is an overall schematic illustration of a frequency converter of the type illustrated in FIG. 1 combining the circuit provisions of FIGS. 2 through 6.

Operation of the overall frequency converter for mains supply frequencies within and exceeding the range of frequencies employable by the load will best be understood with reference to FIGS. 7, 8 and 9.

Figure 7A:
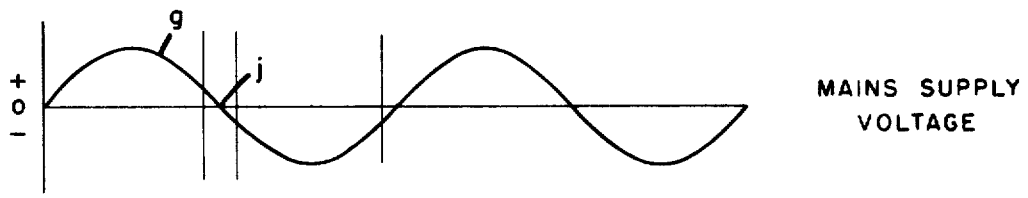
FIG. 7 is a series of diagrams plotting voltages and currents against time and illustrates voltage and current characteristics at selected circuit points when driven from a mains supply having a frequency within the predetermined range of frequencies employable by the load.
Figure 7B:
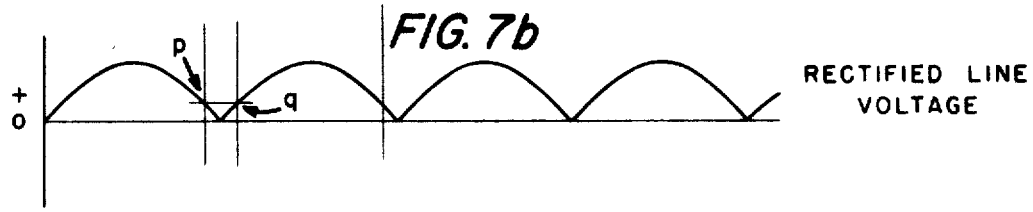

There is shown in FIG. 7(a) a plot of voltage against time for an input voltage, supplied by the mains supply source 11, the voltage waveform being of sinusoidal form and having a frequency within the range of frequencies acceptable for operation of the load or load device 12. For example, where the load 12 includes one or more AC motors rated for operation at a conventional 60 c.p.s., the frequency of the voltage waveform illustrated in FIG. 7(a) would be at or near the desired 60 c.p.s.

Assuming a positive half-cycle g of the applied mains supply voltage to be that half-cycle of input voltage during which the mains supply conductor L1 is positive with respect to the mains supply conductor L2, a trigger signal will be applied to one of the two controlled rectifier bridges formed by the controlled rectifiers 31 through 38, as determined by the output condition of the multivibrator 17. Assuming the output condition of the multivibrator to correspond to conduction of the transistor 98 thereof, a trigger pulse or triggering signal will be applied to the control electrodes of the controlled rectifiers 35 through 38 by reason of the conduction of the transistor 80 of the steering circuit 14. Trigger pulses applied to the control electrodes of the controlled rectifiers 36 and 38 will be applied thereto via the conductor 55, the current therethrough establishing a signal across the resistor 59 when the conductor L2 is negative, as assumed. The return path for current passing the resistor 59 is via the conductor L2, the resistor 76 paralleling the diode 74 and the DC supply conductor 78. Similarly, the return path when current passes the resistor 56 is provided by the conductor L1 and the resistor 75, paralleling the diode 73 and connected with the DC supply conductor 78.

The secondary winding 54 of the transformer T1 is connected with the control electrodes of the controlled rectifiers 35 and 37, care being taken to provide the application of the positive signal to the control electrodes thereof upon passage of a current through the primary winding 96 by conduction of the steering transistor 80. Thus, the controlled rectifiers 35 through 38 will be ready for conduction by reason of the trigger pulses applied thereto and, inasmuch as the conductor L1 is positive with respect to the conductor L2, conduction will be effected in the direction of the arrow 53, through the controlled rectifiers 35 and 36. Thus, the voltage applied to the load 12 will correspond to the half-cycle h of the voltage illustrated in FIG. 7(e) and the load current in the direction of the arrow 53 will correspond to the portion i of the plot of load current against time appearing in FIG. 7(f), the current waveform shown in FIG. 7(f) corresponding to a lagging current such as will be evidenced when the load 12 is of an inductive nature. During the application of the main supply voltage shown in FIG. 7(a), the low level DC power supply 26 will provide a rectified smooth, DC level as described hereinabove and, additionally, an unsmoothed rectified series of unidirectional voltage pulses as illustrated in FIG. 7(b) will be applied by the DC supply 26 to the conductor 71.

Figure 7C:
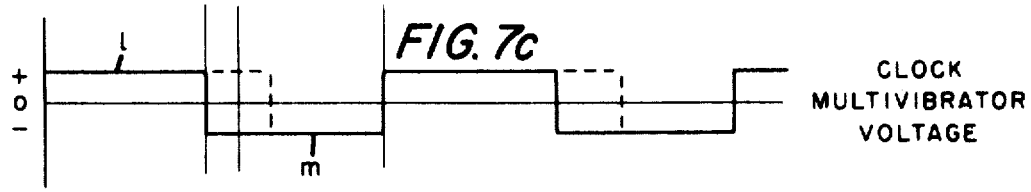
Figure 7D:
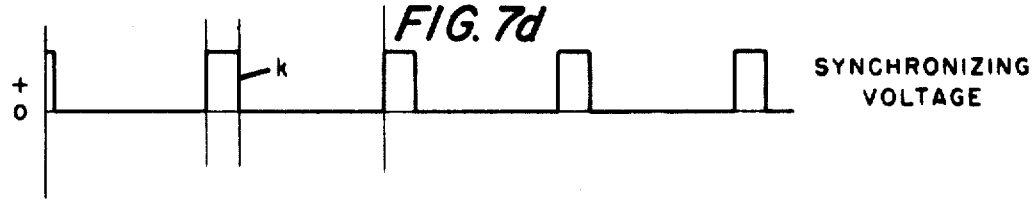

When the voltage appearing upon the conductor 71 reduces to a point p, corresponding to the approach of a crossover point j on the main supply voltage waveform, a pulse k will be produced by the synchronizing and trigger inhibiting pulse generator 21 and employed, as set forth hereinabove, to inhibit the application of trigger pulses to the controlled rectifiers 31 through 38 and, additionally, the pulse k will be applied to the multivibrator 17, effecting a change in the output condition thereof. Accordingly, the transistor 99 of the multivibrator 17 will conduct causing the voltage at the collector thereof and at the conductor 92 to change from the voltage level l to the voltage level m as shown in the full-line waveform of FIG. 7(c). FIG. 7(c) illustrates one output of the multivibrator circuit 17 and the application of the voltage pulses k from the pulse generator 21 shortens the natural, unsynchronized duration of output conditions, which duration is suggested by the broken line extension of the voltage level l in FIG. 7(c).

The steering circuit transistor 81 will now be biased into conduction whereas the steering circuit transistor 80 will assume its nonconducting state and, upon disappearance of the voltage pulse k as the rectified, unsmoothed DC voltage illustrated in FIG. 7(b) reaches the point q shown therein, trigger pulses will be applied to the controlled rectifiers 31 through 34 through the now-conducting transistor 81 of the steering circuit 14, the conductor 44 and the secondary winding 43 of the transformer T1. Current conduction through the load 12 will now occur in the direction of the arrow 52 through the controlled rectifiers 33 and 34 inasmuch as the mains supply conductor L2 has now become positive relative to the mains supply conductor L1. Accordingly, it will be seen that the load voltage of FIG. 7(e) applied to the load 12 follows the mains supply voltage of FIG. 7(a) where the frequency of the source 11 is within the range of frequencies employable by the load 12, the output conditions of the clock multivibrator 17 changing at a rate determined by the mains supply voltage frequency.

Figure 7E:
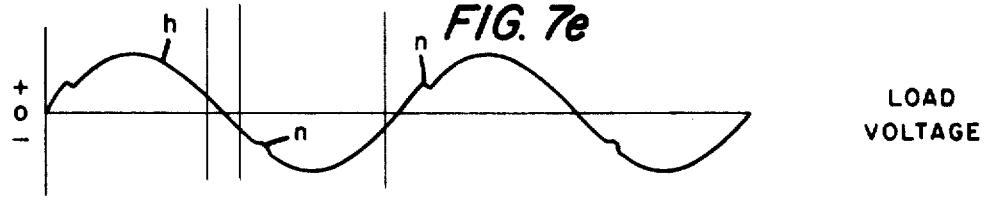
Figure 7F:
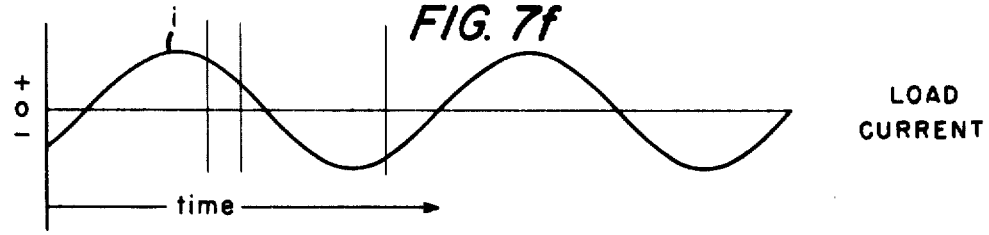

For an inductive load having voltage and current waveforms as shown in FIG. 7(e) and 7(f), current continues to be applied through the controlled rectifiers and the load after reversal of the load voltage because of the inductive nature of the load. Again because of the inductive nature of the load, the load voltage will reverse as seen in FIG. 7(e) and continue to rise in the opposite direction despite the inability of conduction of the recently triggered controlled rectifiers. As the load current reverses direction, the now-triggered controlled rectifiers conduct, causing the voltage across the load to be essentially the voltage across the mains conductors L1 and L2, and only a small departure from a sinusoidal load voltage, as shown at points n in FIG. 7(a), is to be noted in a waveform of the voltage appearing across the load 12.

When a mains supply voltage of a frequency exceeding the range of frequencies employable by the load 12 is applied across the mains supply conductors L1 and L2 as exemplified by the mains supply voltage illustrated in FIG. 8(a), a series of unidirectional pulses o as illustrated in FIG. 8(b), is provided by the low level DC power supply and the rectified unsmoothed signal constituted by the series of pulses o is applied via the conductor 71 to the synchronizing and trigger inhibiting pulse generator 21 for the production of a series of spaced pulses r as shown in FIG. 8(b), the pulses r corresponding to the crossover points of the mains supply voltage.

Assuming again the output condition to the multivibrator 17 to correspond to conduction of the multivibrator transistor 98, the steering transistor 80 will conduct applying a trigger pulse to the controlled rectifiers 35 through 38 via the conductor 55 and the secondary winding 54 of the transformer T1. However, triggering of the controlled rectifiers 35 through 38 will be inhibited during periods corresponding to the production of the pulses r by application of the pulses to the base of the steering transistor 80 via the conductor 127, the resistor 128 and the diode 131.

During the period of conduction of the multivibrator transistor 98 and its associated steering transistor 80, several reversals of polarity of mains supply voltage will have occurred. However, current through the load 12 will be in the direction of the arrow 53, the controlled rectifiers 35 through 38 providing full-wave rectification during this period.

Also during this time, the remaining multivibrator transistor 99 will be in its nonconducting state providing an output level s as shown in FIG. 8 at the conductor 92. As the multivibrator 17 approaches the end of its natural, unsynchronized output duration, one of the pulses r is applied thereto from the pulse generator 21 and the pulse r' will be effective to override the natural output frequency of the multivibrator, causing conduction of the transistor 99 and halting conduction of the remaining transistor 98.

As the voltage appearing at the conductor 92, connected with the collector of the multivibrator transistor 99, drops with a change in output condition of the multivibrator, the associated steering transistor 81 of the trigger steering circuit 14 conducts upon termination of the simultaneously occurring pulse r' applied to the base of the steering transistor 81 from the pulse generator 21. Conduction of steering transistor 81 effects triggering of the controlled rectifiers 31 through 34 as described hereinabove and an ensuing period of full-wave rectification of opposite polarity begins, the load current now assuming the direction of the arrow 52 in FIG. 9.

The precise frequency of the load voltage and load current will again be dependent upon the frequency of the mains supply voltage inasmuch as the occurrence of the pulses r shown in FIG. 8(d) depends upon the crossover points of the mains supply voltage. However, the load voltage and load current frequency will approach the natural, unsynchronized frequency of the multivibrator circuit 17, being somewhat higher than that natural frequency by reason of the overriding thereof by the application of the synchronizing and inhibiting pulses r. For example, a multivibrator as described hereinabove and having a natural, unsynchronized frequency in the range 40—45 c.p.s. provides load frequencies suitable for employment with AC motors rated at 60 c.p.s. In such an arrangement, with applied mains supply voltages having frequencies at or near 400 c.p.s., voltage reversal may be provided every 6 half cycles of applied mains supply voltage, providing a load voltage with a frequency of 66.6 c.p.s. or voltage reversal may be provided every 7 half-cycles of applied main supply voltage, providing a load voltage having a frequency of 57 c.p.s., the exact load voltage frequency depending upon the natural, unsynchronized frequency selected for the multivibrator within the range of approximately 40—45 c.p.s. Similarly, with an applied mains supply voltage having a frequency of 1,500 c.p.s., the polarity of rectification provided by the double bridge switching circuit 13 may be reversed at a time corresponding with every 25th synchronizing pulse or, in other words, every 25th half-cycle of applied mains supply voltage, and the load voltage frequency will be precisely 60 c.p.s.

For mains supply voltages exceeding the range of frequencies employable by the load 12, the load voltage and load current will be of the form indicated in FIGS. 8(e) and 8(f). Again, application of the capacitor 63 across the load 12 is suitable for prevention of the load voltage going to zero volts during rectification between reversals of polarity of the mains supply and the average voltage applied to the load is increased accordingly. Additional output wave-shaping provisions may be provided, if desired. However, adequate operation of, for example, an AC motor, acting as the load 12, is obtained with load voltage and load current waveforms of the types illustrated in FIGS. 8(e) and 8(f).

While a preferred embodiment of the invention has been described hereinabove, it will be apparent to those skilled in the art that variations and modifications of such preferred embodiment may be effected without departure from the spirit and scope of the invention embodied therein.

We claim:

1. In a frequency converter for providing an output having a frequency within a predetermined range of frequencies from an input of a frequency within or outside said predetermined range, the combination comprising means for rectifying an AC input to provide a rectified output of polarity alternating at a frequency within said predetermined range of frequencies, timing circuit means having a natural unsynchronized output frequency outside said predetermined frequency range, means coupled with said timing circuit means for overriding said natural frequency to provide an imposed output frequency from said timing circuit means within said predetermined range, and means coupled with said timing circuit means and said means for rectifying for controlling said means for rectifying to provide alternation of said rectified output at the output frequency of said timing circuit means within said predetermined range, said timing circuit means comprising an astable multivibrator having first and second output conditions naturally occurring at said natural unsynchronized frequency outside said predetermined frequency range, and said means for overriding said natural frequency comprising means for decreasing the duration of both said first and second output conditions of said multivibrator in response to the frequency of the AC input thereby providing repetitive alternate occurrence of said first and second output conditions at said imposed frequency within said predetermined frequency range.

2. The combination according to claim 1 wherein said means for decreasing the duration of said output conditions of said multivibrator comprises pulse production means for providing a pulse at each of the crossover points of an alternating input voltage, and means for supplying said pulses to said multivibrator to alter each output condition thereof at a time approaching the natural duration of each output condition.

3. The combination according to claim 2 wherein said multivibrator comprises first and second transistors, means coupling together said first and second transistors for halting conduction of either of said first and second transistors in response to conduction of the remaining one of said first and second transistors, first and second output means connected with said first and second transistors for providing said first and second output conditions of said multivibrator, and time delay means coupled with each of said first and second transistors for establishing the natural unsynchronized duration of conduction and nonconduction of said transistors, said pulse production means being connected with each of said transistors for alternately driving each of said transistors into conduction prior to expiration of the natural duration of conduction of the remaining transistor.

4. The combination according to claim 1 wherein said means for rectifying comprises first and second signal responsive rectifier means for providing rectified output voltage of opposite polarities, respectively, said means for controlling said means for rectifying including means coupled with each of said first and second rectifier means for alternately applying trigger signals thereto corresponding to said first and second output conditions of said timing circuit means, whereby the polarity of rectified output voltage alternates at said imposed frequency of said timing circuit means within said predetermined frequency range.

5. In a frequency converter for providing an output having a frequency within a predetermined range of frequencies from an input of a frequency within or outside said predetermined range, the combination comprising means for rectifying an AC input to provide a rectified output of polarity alternating at a frequency within said predetermined range of frequencies, timing circuit means having a natural unsynchronized output frequency outside said predetermined frequency range, means coupled with said timing circuit means for overriding said natural frequency to provide an imposed output frequency from said timing circuit means within said predetermined range, and means coupled with said timing circuit means and said means for rectifying for controlling said means for rectifying to provide alternation of said rectified output at the output frequency of said timing circuit means within said predetermined range, said timing circuit means comprising an astable multivibrator, said means coupled with said timing circuit means and said means for rectifying for controlling said means for rectifying including means coupled with said multivibrator for providing alternating steering signals effecting alternation of said rectified output from said means for rectifying, said combination further including rectifying and smoothing means for providing a DC biasing potential for said multivibrator and said steering circuit means by rectification of the AC input and smoothing of the resultant DC signal, said means coupled with said timing circuit means for overriding said natural frequency including pulse production means coupled with said rectifying and smoothing means for receiving the rectified DC signal of said rectifying and smoothing means, prior to smoothing, and for applying pulses in synchronization the AC input to said multivibrator to change the frequency thereof from said natural frequency to said imposed frequency.

6. The combination according to claim 5 wherein said means for rectifying to provide a rectified output of alternating polarity includes a plurality of unidirectional switching means, means for coupling the AC input with said unidirectional switching means, said means for providing alternating steering signals being coupled with said unidirectional switching means for triggering said switching means into conduction and said means for applying pulses to said multivibrator being coupled with said steering circuit means for inhibiting the triggering of said unidirectional switching means during production of said pulses.

7. A frequency converter for providing an output within a range of employable frequencies from an input of a frequency within or outside said range of employable frequencies including means for rectifying an AC input and for providing a rectified output of alternating polarity, means coupled with said means for rectifying for controlling the polarity of rectified output from said rectifying means, means coupled with said means for controlling the polarity for controlling the duration between output polarity alternations, means for producing pulses in synchronization with crossover points of the AC input, means for applying the pulses from the means for producing pulses to said means for controlling the duration to control the timing thereof, and means for applying the pulses from the means for producing pulses to said means for controlling the polarity for inhibiting operation of the means for controlling the polarity during the application of said pulses thereto, said means for rectifying including a first and second rectifier means for providing outputs of alternate polarities, said means for controlling the polarity including first and second steering circuit means for alternately directing trigger signals to said first and second rectifier means, respectively, said means for controlling the duration being coupled with said first and second steering circuit means for alternately actuating said first and second steering circuit means at a frequency determined by said means controlling the duration, and said means for applying the pulses to said means for controlling the polarity being coupled with both said first and second steering circuit means for inhibiting operation of both said first and second steering circuit 8. The frequency converter according to claim 7 wherein said first and second rectifier means comprise first and second controlled rectifier bridges, respectively, each of said bridges comprising a plurality of controlled rectifiers, said controlled rectifiers each including a control electrode for readying the controlled rectifier for conduction upon energization of said electrode, said first and second steering means being coupled to ones of said control electrodes for controlling conduction of said controlled rectifiers, and said means for producing pulses including means for providing pulses of sufficient duration to allow extinguishing of a conducting controlled rectifier before triggering of a further controlled rectifier.

9. A frequency converter for providing an output within a range of employable frequencies from an input of a frequency within or outside said range of employable frequencies including means for rectifying an AC input and for providing a rectified output of alternating polarity, means coupled with said means for rectifying for controlling the polarity of rectified output from said rectifying means, means coupled with said means for controlling the polarity for controlling the duration between output polarity alternations, means for producing pulses in synchronization with crossover points of the AC input, means for applying the pulses from the means for producing pulses to said means for controlling the polarity for inhibiting operation of the means for controlling the polarity during the application of said pulses thereto, and means for deriving a DC operating potential for said triggering means and said timing means, said means for deriving including further means for rectifying the AC input and means for smoothing the rectified signal of said further means for rectifying, said means for producing pulses being coupled to said further means for rectifying 10. The frequency converter according to claim 9 wherein said means for producing pulses comprises means for producing a pulse in response to reduction in voltage to a predetermined level between maximum rectified unidirectional pulse levels from said further means for rectifying, and for terminating a pulse in response to an increase in voltage following said reduction, whereby the produced pulses correspond to a time period spanning the crossover points of the AC input voltage.

11. A frequency converter for providing an output within a range of employable frequencies from an input of a frequency within or outside said range of employable frequencies including means for rectifying an AC input and for providing a rectified output of alternating polarity, means coupled with said means for rectifying for controlling the polarity of rectified output from said rectifying means, means coupled with said means for controlling the polarity for controlling the duration between output polarity alternations, means for producing pulses in synchronization with crossover points of the AC input, means for applying the pulses from the means for producing pulses to said means for controlling the duration to control the timing thereof, and means for applying the pulses from the means for producing pulses to said means for controlling the polarity for inhibiting operation of the means for controlling the polarity during the application of said pulses thereto, said means for controlling the duration comprises means for providing first and second output conditions at a natural unsynchronized frequency lower than the desired output frequency of said frequency converter, said means for providing first and second output conditions being responsive to pulses applied thereto near the end of the natural duration of either of said output conditions for altering the output condition thereof.

PO-1050
(5/69)

UNITED STATES PATENT OFFICE
CERTIFICATE OF CORRECTION

Patent No. 3,593,104          Dated July 13, 1971

Inventor(s) William W. Fisher and John W. Pike

It is certified that error appears in the above-identified patent and that said Letters Patent are hereby corrected as shown below:

Column 1, line 46, "main" should be -- mains --; Column 2, line 29, after "device" insert -- and maintained therewith, allowing employment of that device --; Column 3, line 7, "by by" should be -- by --; Column 7, line 65, "and (99" should be -- and 99 --; Column 9, line 19, "FIg" should be -- Figure --; Column 11, line 69, "condition to the" should be -- condition of the --; Column 14, line 63 after "circuit" insert -- means during cross-over of the A.C. input voltage to inhibit initial actuation of said first and second rectifier means during application of the pulses to the steering circuit means --; Column 15, line 12 after "controlling the" insert -- duration to control the timing thereof, means for applying the pulses from the means for producing pulses to said means for controlling the --; line 20, after "rectifying" insert -- for the production of pulses in response to variations in the rectified signal from said further means for rectifying to provide synchronization of said pulses with the A.C. input --.

Signed and sealed this 18th day of April 1972.

(SEAL)
Attest:

EDWARD M. FLETCHER, JR.
Attesting Officer

ROBERT GOTTSCHALK
Commissioner of Patents